United States Patent [19]

Tohata et al.

[11] Patent Number: 4,636,050
[45] Date of Patent: Jan. 13, 1987

[54] REFLECTION TYPE OVERHEAD PROJECTOR

[75] Inventors: Susumu Tohata; Kunio Numata, both of Tokyo, Japan

[73] Assignee: Kabushiki Kaisha Gakushu Kenkyusha, Japan

[21] Appl. No.: 684,043

[22] Filed: Dec. 20, 1984

[30] Foreign Application Priority Data

Dec. 26, 1983 [JP] Japan .................. 58-204301[U]
Jun. 8, 1984 [JP] Japan ................... 59-85423[U]

[51] Int. Cl.⁴ ............................................. G03B 21/06
[52] U.S. Cl. ..................................... 353/66; 353/101; 353/38
[58] Field of Search ....................... 353/63–68, 353/100, 101, 57, 44, 37, 38, DIG. 4

[56] References Cited

U.S. PATENT DOCUMENTS

| | | |
|---|---|---|
| 3,340,765 | 9/1967 | Herriott ............... 353/44 X |
| 3,459,475 | 8/1969 | Lucas .................... 353/37 |
| 3,619,048 | 11/1971 | Engert ................. 353/66 X |
| 3,947,103 | 3/1976 | Altman ............... 353/65 X |
| 3,951,535 | 4/1976 | Altman .................. 353/66 |
| 4,111,537 | 9/1978 | Wells et al. ........... 353/101 |
| 4,386,833 | 6/1983 | Hirose .................. 353/67 |

FOREIGN PATENT DOCUMENTS

| | | |
|---|---|---|
| 289833 | 1/1916 | Fed. Rep. of Germany . |
| 385259 | 12/1923 | Fed. Rep. of Germany ........ 353/66 |
| 814949 | 9/1951 | Fed. Rep. of Germany ........ 353/65 |
| 1472281 | 5/1966 | Fed. Rep. of Germany . |
| 7018612 | 5/1970 | Fed. Rep. of Germany . |
| 2708067 | 8/1977 | Fed. Rep. of Germany . |
| 439042 | 9/1948 | Italy ........................ 353/67 |

OTHER PUBLICATIONS

Technische Optik, G. Schröder, 1974—excerpts.

*Primary Examiner*—Harry N. Haroian
*Attorney, Agent, or Firm*—Hall, Myers & Rose

[57] ABSTRACT

A reflection type overhead projector employs a Fresnel concave mirror adapted for allowing a transparency to be put on the mirror surface thereof. The beam of light emitted from a light source lamp is reflected by the Fresnel concave mirror, enters a projecting lens and then is projected on a screen. A reflecting mirror is interposed in an optical path between the Fresnel concave mirror and the projecting lens to thereby bend the optical path. The Fresnel concave mirror, the light source lamp and the projecting lens are all mounted to a single case.

6 Claims, 13 Drawing Figures

REFLECTION TYPE OVERHEAD PROJECTOR

BACKGROUND OF THE INVENTION

1. Field of the Invention

The present invention relates to a projector for projecting a picture on a screen, and more particularly to a reflection type overhead projector.

2. Description of the Related Art

Heretofore, there is known a reflection type overhead projector in which a Fresnel concave mirror is utilized. The term of a Fresnel concave mirror means a mirror which is formed in such a manner that a usual concave mirror is cut into separate concentric annular parts each having a fine width, and these annular parts are rearranged on the same plane, the mirror having a planar plate shape in the entire configuration but serving to function as a concave mirror. Hereinafter, what is referred to as a Fresnel mirror represents a Fresnel concave mirror. The foregoing projector is so arranged that a Fresnel mirror is fitted to the upper surface of a unit body with the mirror surface thereof facing upwardly. A post is erected at one upper corner of the body. A transparency put on the Fresnel mirror is irradiated using a light source within a projector head attached to the upper end of the post, and the reflected light from the transparency is projected on a screen through a projecting lens within the projector head and a reflecting mirror. The most valuable advantage of the projector of this type is in making it possible to employ a transparency of relatively large size. While production of a small-sized transparency must be relied on (the photographic technology), a large-sized transparency can be produced by printing with ink, handwriting or other alternatives to photographic technology. A large-sized transparency is subjected to correction or revision with little difficulty. Furthermore, a large-sized transparency has another advantage, which cannot be otherwise obtained; a particular point may be indicated on a viewing screen, by pointing a small stick to the corresponding location on the transparency.

However, use of a large-sized transparency necessarily requires an increased distance between a plate on which the transparency is put and the projecting lens. The aforesaid post is employed to make the unit lighter while maintaining a sufficient distance between the plate and lens. This arrangement presents the problem that, because the projector head which incorporates a light source and the projecting lens are supported at the upper end of the post. The optical axis may easily be misaligned even with a slight shift of the post. Hence, the transparency cannot be correctly projected on the screen. Although a projector of a type which is provided with a foldable post so as to reduce the unit size has been proposed, such an arrangement is susceptible to misalignment at the joint portion between the post and the body, thus resulting in optical axis misalignment.

SUMMARY OF THE INVENTION

The present invention seeks to solve the above-mentioned problems encountered in the conventional reflection type overhead projectors, and has for its object to provide a reflection type overhead projector which is very compact in the overall size, and which is not susceptible to misalignment of the optical axis.

To achieve the above object, the reflection type overhead projector according to the present invention comprises a case, a Fresnel concave mirror attached to the case and adapted to receive a transparency thereon, light source means, and projecting lens means, where the light beam emitted from the light source means is reflected by the Fresnel concave mirror to the projecting lens means. Reflecting mirror means is interposed in an optical path between the Fresnel concave mirror and the projecting lens means to thereby bend the optical path. In addition, the projecting lens means and the light source means are both mounted to the case.

The above and further objects, details and advantages of the present invention will become apparent from the following detailed description of preferred embodiments thereof, when read in conjunction with the accompanying drawings.

DETAILED DESCRIPTION OF PREFERRED EMBODIMENTS

In each of FIGS. 1 to 5, the left-hand side corresponds to the direction of projection, i.e., the front side of a projector. These figures are schematic views showing the arrangement of basic optical geometry and main elements of respective embodiments, and therefore simplified with details being omitted.

Figure 1:
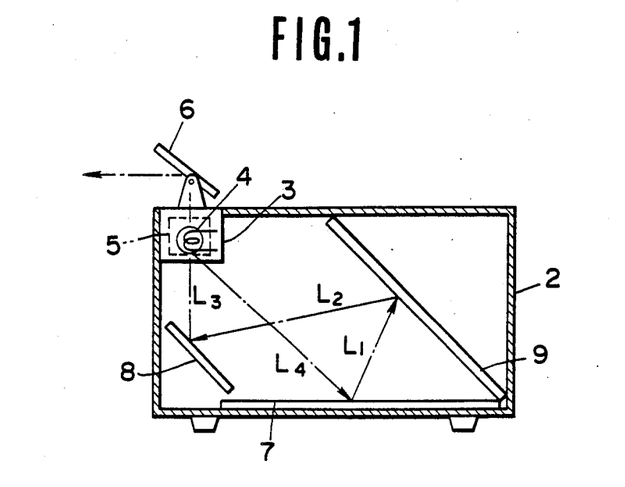
FIG. 1 is a schematic view showing the basic structure of a projector in accordance with a first embodiment of the present invention.

FIG. 1 shows a projector in accordance with a first embodiment of the present invention. In this embodiment, a projector head 3 is attached to the upper front portion of case 2. Projector head 3 is composed of light source 4, projecting lens 5 and reflecting mirror 6, light source 4 and projecting lens 5 being disposed in parallel transversely, i.e., juxtaposed in the direction perpendicular to the plane of the drawing. Fresnel mirror 7 is provided on the bottom of case 2, and first reflecting mirror 8 is fixed to case 2 in a position below projector head 5 with the mirror surface thereof facing upwardly and rearwardly. In the rear portion of case 2 and above Fresnel mirror 7 there is fixed second reflecting mirror 9 with the mirror surface thereof facing downwardly and forwardly. These first and second reflecting mirrors 8 and 9 are each secured at such an angle that the beam of light emitted from light source 4 may effectively enter projecting lens 5 after being reflected by Fresnel mirror 7.

When a transparency is put on Fresnel mirror 7 and irradiated with the light beam from light source 4, the light beam having passed the transparency is reflected by Fresnel mirror 7, enters projecting lens 5 via second reflecting mirror 9 and first reflecting mirror 8, and then is projected on a screen via another reflecting mirror 6 above projecting lens 5 (the optical path is indicated by one-dot chain lines in the figure).

While the conventional reflection type overhead projector mentioned at the beginning of this specification required the length of (L1)+(L2)+(L3) (see FIG. 1) as an actual distance between Fresnel mirror 7 and projector head 3, this embodiment requires just the length (L4) as an actual distance between Fresnel mirror 7 and projector head 3, so that the unit is compacted in the overall size. It is to be noted that, in this embodiment some light intensity is lost due to reflections. Because projector head 3 including light source 4 is housed in case 2 and two reflecting mirrors are interposed in the optical path between the Fresnel mirror and the projecting lens, such intensity loss can be compensated for by use of a cooling fan or the like within case 2. The cooling fan allows for an increase in the power of light source 4.

Figure 2:
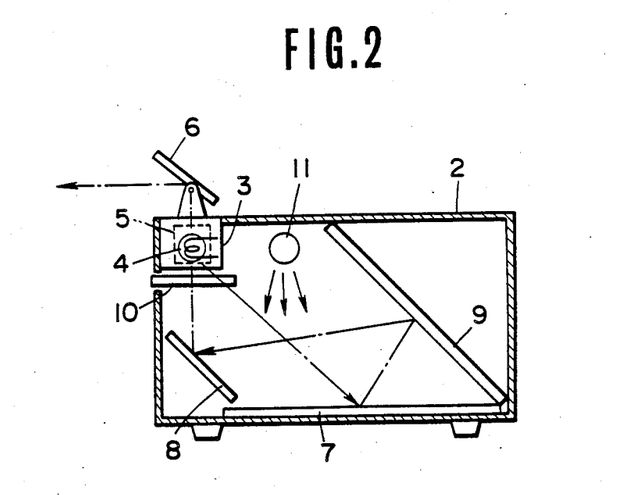
FIG. 2 is a schematic view showing the basic structure of a modified example of the projector of FIG. 1.

FIG. 2 shows a projector which is a modified example of the foregoing first embodiment. In this projector, slide device 10 for holding small-sized slides, for example, 35 mm positive films, etc. is provided between the projecting lens 5 and first reflecting mirror 8. Irradiating lamp 11 adapted to illuminate an object placed on Fresnel mirror 7 is provided in a space above Fresnel mirror 7. With slide device 10 being provided in this manner, this projector can be also utilized as a projector for small-sized slides in addition to its primary function as a large-sized transparency projector. Provision of irradiating lamp 11 makes it possible to utilize this projector as an actual object projector. When this projector is employed as a projector for small-sized slides, an auxiliary lens is attached to projecting lens 5.

Figures 3, 4, 5, 6:
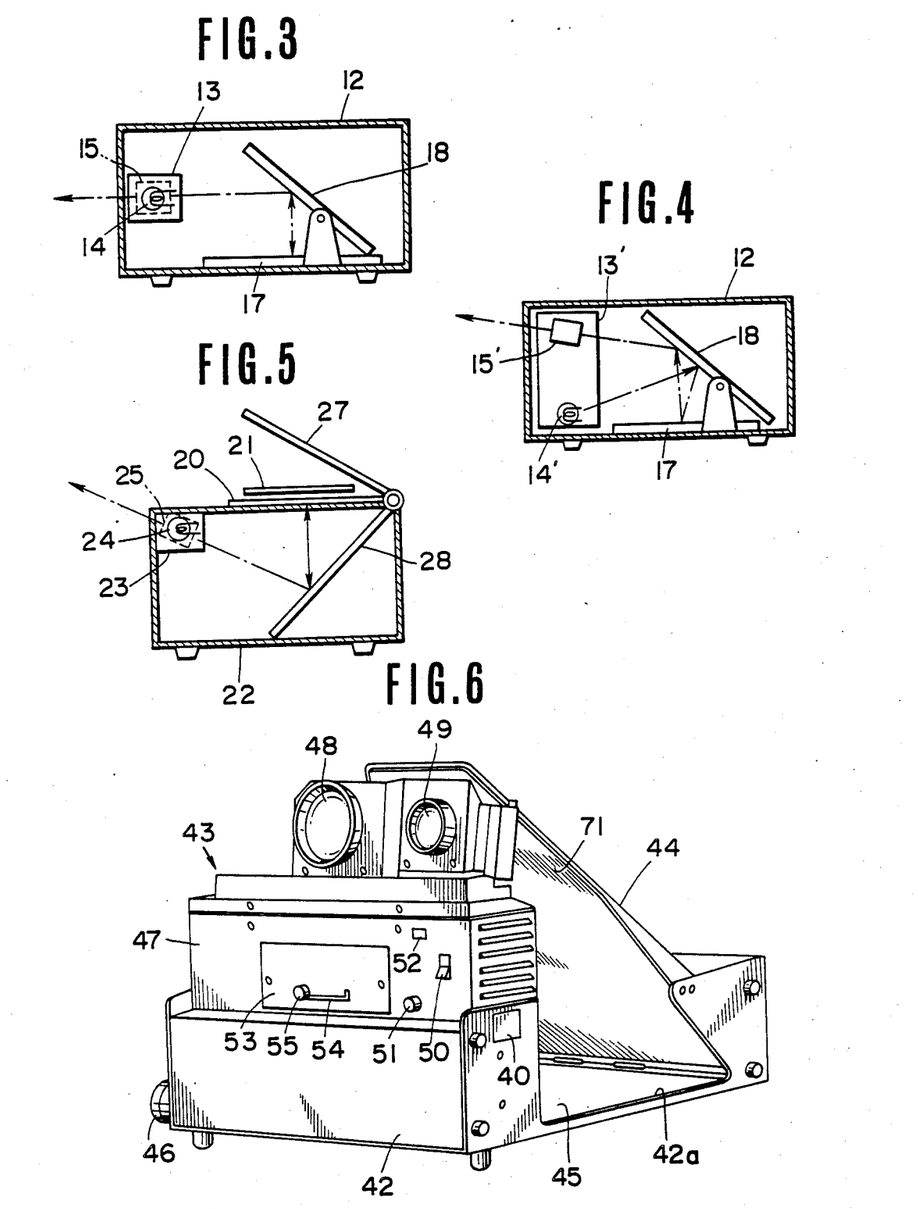
FIG. 3 is a schematic view showing the basic structure of a projector in accordance with a second embodiment of the present invention.
FIG. 4 is a schematic view showing the basic structure of a modified exmaple of the projector of FIG. 3.
FIG. 5 is a schematic view showing the basic structure of a projector in accordance with a third embodiment of the present invention.
FIG. 6 is a perspective view of a projector in accordance with a fourth embodiment of the present invention.

FIGS. 3 and 4 depict projectors in accordance with a second embodiment of the present invention and a modified example thereof, respectively. In each of these projectors, single reflecting mirror 18 is interposed in the optical path between Fresnel mirror 17 and projecting lens 15 and pivotably connected to case 12 through a tilting mechanism, reflecting mirror 18 being disposed so that the mirror surface thereof normally faces downwardly and forwardly. Moreover, the need for a reflecting mirror corresponding to reflecting mirror 6 provided above projecting lens 5 in the first embodiment is dispensed within these projectors. The projectors in FIGS. 3 and 4 are different from each other in their projector heads 13 and 13'. More specifically, while light source 14 and projecting lens 15 are juxtaposed transversely (i.e., in the direction perpendicular to the plane of the drawing) in the projector of FIG. 3, light source 14' and projecting lens 15' are juxtaposed vertically in the projector of FIG. 4.

In the above arrangement, the beam of light from light source 14 or 14' impinges on a transparency put on Fresnel mirror 17 via reflecting mirror 18. The reflected light beam from Fresnel mirror 17 enters projecting lens 15 or 15' via reflecting mirror 18 once again and then is projected onto a screen.

A projector in accordance with a third embodiment of the present invention illustrated in FIG. 5 is such that optical geometry of the projector is inverted when compared with that of FIG. 3. More specifically, projector head 23 incorporating therein light source 24 and projecting lens 25 is attached to the upper front portion of case 22, and reflecting mirror 28 is fixed within case 22 at a predetermined angle with the mirror surface thereof facing upwardly and forwardly. Furthermore, transparent plate 20 is fitted to the top of case 22 and Fresnel mirror 27 is pivotably hinged to transparent plate 20 in a position near one side of the latter, so that the mirror surface of Fresnel mirror 27 may come into close contact with the upper surface of transparent plate 20 to hold transparency 21 therebetween.

Also in this projector, as with the projector of FIG. 3, the beam of light from light source 24 impinges on transparency 20 via reflecting mirror 28, and the reflected light therefrom then enters projecting lens 25. Incidentally, although the reflecting mirrors are fixed to the cases in the respective projectors of FIGS. 1, 2 and 5, the angle of each reflecting mirror may be adjusted by incorporating therewith the tilting mechanism of the projectors depicted in FIGS. 3 and 4.

According to the present invention, as described above, since the need for the post used in the conventional reflection type overhead projector is eliminated, misalignment of the optical axis due to a shift of the post and hence failed projection is prevented. Other aspects such as reduction of the overall projector height are also realized to realize a more compacted unit.

In the projectors as mentioned above, either one or three reflecting mirrors (excluding the Fresnel mirror) are present in the optical path. This feature is important for the reason that, if the transparency is not put on the Fresnel mirror with the right side thereof facing upwardly, it would be very difficult to indicate a particular point on the screen with a small stick or the like. An odd number of mirrors is required in order to allow the transparency to be put in such a proper attitude. Further, it is preferred to maintain a minimum number of mirrors in order to minimize the optical loss from reflection. Therefore, one or three reflecting mirrors are preferred.

Hereinafter, a projector in accordance with a fourth embodiment of the present invention and having the basic structure analogous to that of FIG. 4 will be described in detail with reference to FIGS. 6 to 12.

As shown in FIG. 6, this reflection type overhead projector comprises box-like case 42 provided in the left lateral side with cut-out portion 42a, projector head 43 rotatably supported to the front portions of both lateral sides of case 42, plate member 44 with reflecting mirror 71 rotatably supported to the upper rearward portions of both lateral sides of case 42 and having the front end thereof being raised and locked in position when used, and Fresnel mirror 45 disposed on the inner bottom of case 42. Projector head 43 comprises a light source system including two light source lamps 57 and 60 (see FIG. 8), and projecting lens system including two projecting lenses 48 and 49.

Case 42 is made of an aluminum alloy and serves as a base for the optical system comprising projector head 43, reflecting mirror 71 and Fresnel mirror 45 during the time when the projector is used, whereas it serves as an accommodating case to accommodate those components when the projector is not used. Cut-out portion 42a provided in the left lateral side of case 42 is disposed to allow the user's hand to enter the case for properly placing the transparency on Fresnel mirror 45 or to write writing on the transparency. Cut-out portion has the front edge thereof formed to extend vertically along the rear surface of projector head 43, the rear edge thereof formed with its front end extending along the rear portion of side end of plate member 44. When lifted and locked in position, the lower edge thereof is located coincident with a level of the mirror surface of Fresnel mirror 45. At the lower front portion of case 42 on the right side, there is further provided knob 46 for adjusting the angle of the entire projector.

Projector head 43 includes lamp box 47 made of the same material as that of case 42, light source lamps 57 and 60, a conventional cooling fan (not illustrated), and two projecting lens 48 and 49. On the front surface of lamp box 476, there are provided power source switch 50, safety fuse 51 and actuator indicator 52 for the light source lamps, as well as cover 53 at the central portion thereof. Cover 53 is opened when cleaning the inside of the lamp box 47 or replacing a light source reflecting mirror 58 or lamps 57 or 60. Substantially at the central portion of the cover 53 are provided guide hole 54 and light source lamp replacing knob 55 extending through the guide hole 54. Furthermore, ventilators are bored in both lateral sides of the lamp box. Meanwhile, two projecting lenses are provided above lamp box 47. More specifically, lefthand projecting lens 49 is employed to project the picture of a small-sized slide (e.g. 35 mm), whereas right-hand projecting lens 48 is employed to project the picture of a transparency located on Fresnel mirror 45.

The optical system of such projector will be described below by referring to FIG. 7. Light source reflecting mirror 58 and condenser lens 59 are both disposed within lamp box 47 along the longitudinal center line of the projector. Light source reflecting mirror 58 is supported by supporting member 47a near the front wall of lamp box 47 with the mirror surface thereof facing rearwardly, and condenser lens 59 is supported by another supporting member 47b near the rear wall of the lamp box. At the width-wise center of the rear wall of lamp box 47, there is bored opening 76 opposite to the condenser lens 59.

Lamp box 47 further includes front and rear rail shafts 61, each of which is extended horizontally and transversely near the bottom wall of lamp box 47 and fixed at both ends thereof to the left and right side walls of lamp box 47. Lamp carriage 56 is slidably mounted on the rail shafts, and two lamps 57 and 60 (preferably halogen lamps) are fixed on the lamp carriage side by side in the transverse direction.

Figure 8:
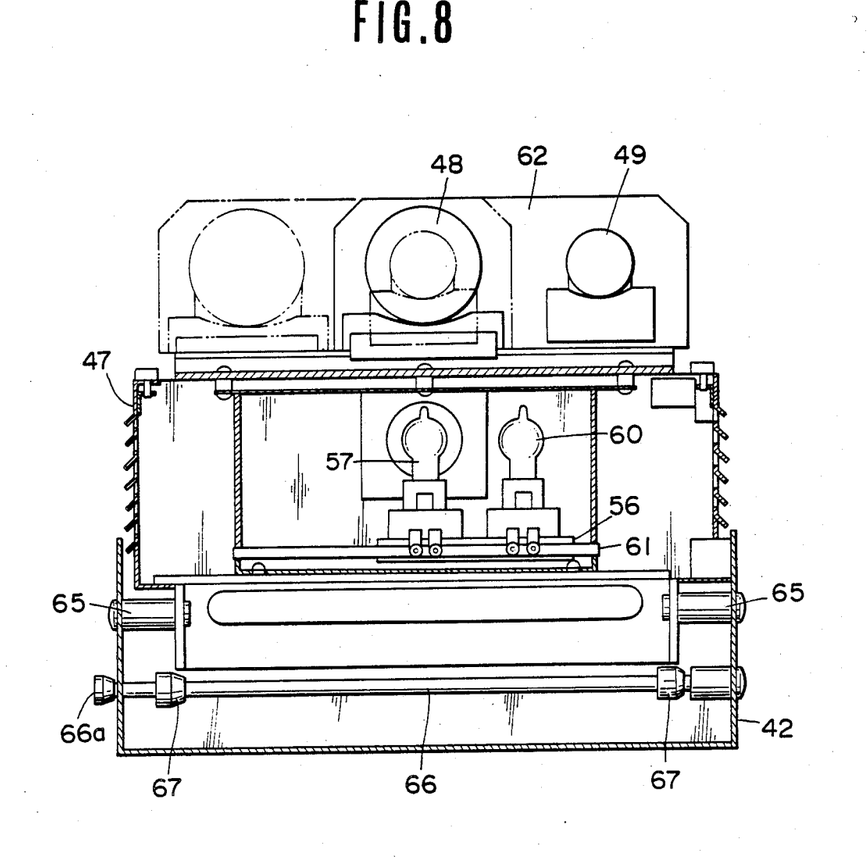
FIG. 8 is a front sectional view taken along the line VIII—VIII in FIG. 7.

Two light source lamps 57 and 60 are provided so that if either one of the light source lamps should burn out during use of the projector, it may be replaced by another light source lamp. Such replacement is carried out by moving light source lamp replacing knob 55 having its fore end projected out of the front surface of lamp box 47, the knob being attached at its proximal end to lamp carriage 56, along guide hole 54 to the left or right, i.e., by moving lamp carriage 56 to the left or right. This feature minimizes the time loss required for removing and replacing the light source lamp just after burning-out (which is too hot to be directly touched with the hand). FIG. 8 depicts lamp replacing knob 55 after it has been moved to the left end (right end in FIG. 8) of guide hole 54 illustrated in FIG. 6, i.e., right-hand (left-hand in FIG. 8) light source lamp 57 is in a usable position. In this position, the light emitting part of usable light source lamp 57 is located between light source reflecting mirror 58 and condenser lens 59.

Projecting lenses 48 and 49 are attached on lens holder 62 side by side in the transverse direction, and lens holders 62 is mounted to translate along the top wall of lamp box 47 so that either one of the projecting lenses may be selected and used upon movement of lens holder 62. In FIG. 8, imaginary lines indicate the relative position of projecting lens 49 for use with a small-sized slide. The solid lines indicate the position of projecting lens 48 for projection of large-sized transparency.

Figure 7:
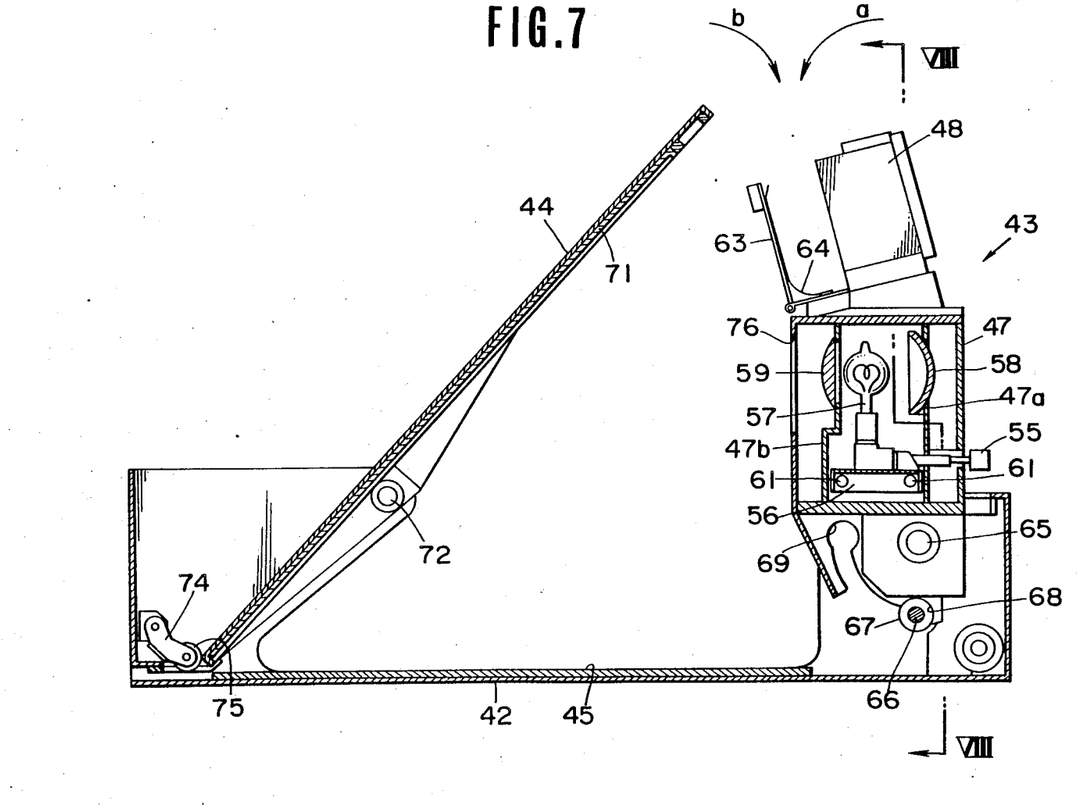
FIG. 7 is a side sectional view of the projector of FIG. 6.

Slide projecting lens 49 is provided at the back side with slide holder 63 for holding small-sized slides (FIG. 7). Slide holder 63 is tiltable toward projecting lens 49, so that, when projector head 43 is properly positioned in case 42, the upper end of the slide holder is moved toward projecting lens 49 to avoid interference with Fresnel mirror 45 (see FIG. 9). Lens holder 63 is normally urged by means of spring 64 such that the upper end of the former is caused to pivot in the direction away from the projecting lens. But because such pivotal movement is limited to a position where lens holder 63 becomes parallel with the surface of the projecting lens, the slide holder is automatically moved into that position so as to be usable, when projector head 43 is turned upright on case 42.

Figure 11:
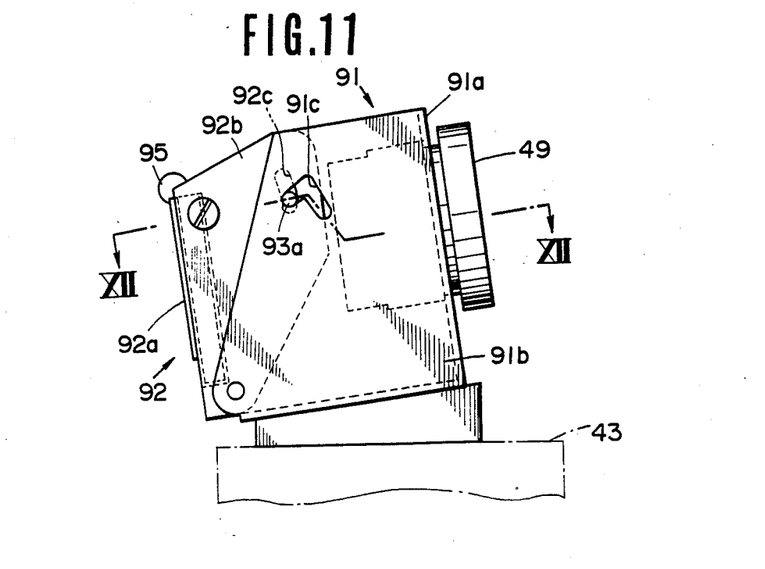
FIG. 11 is a side view of a slide holder adapted to be used for the projector of FIG. 6.
Figure 12:
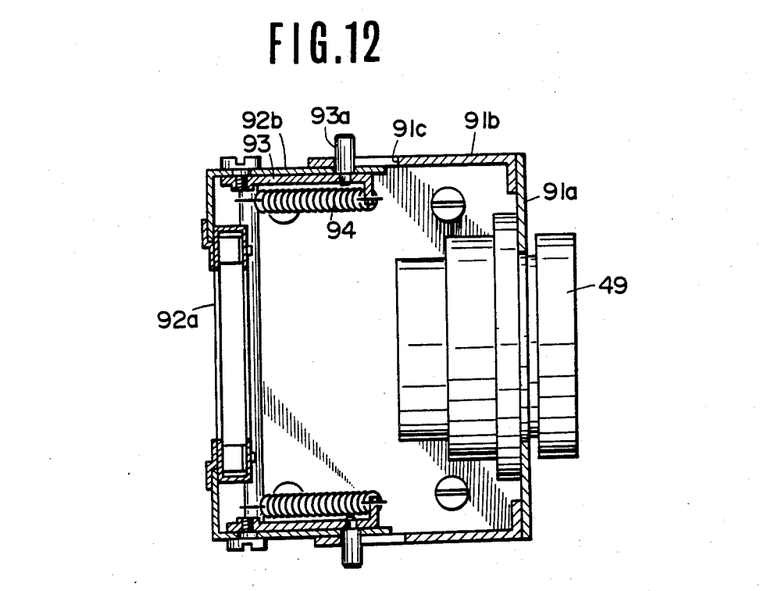
FIG. 12 is a top sectional view taken along the line XII—XII in FIG. 11.
Figure 13:
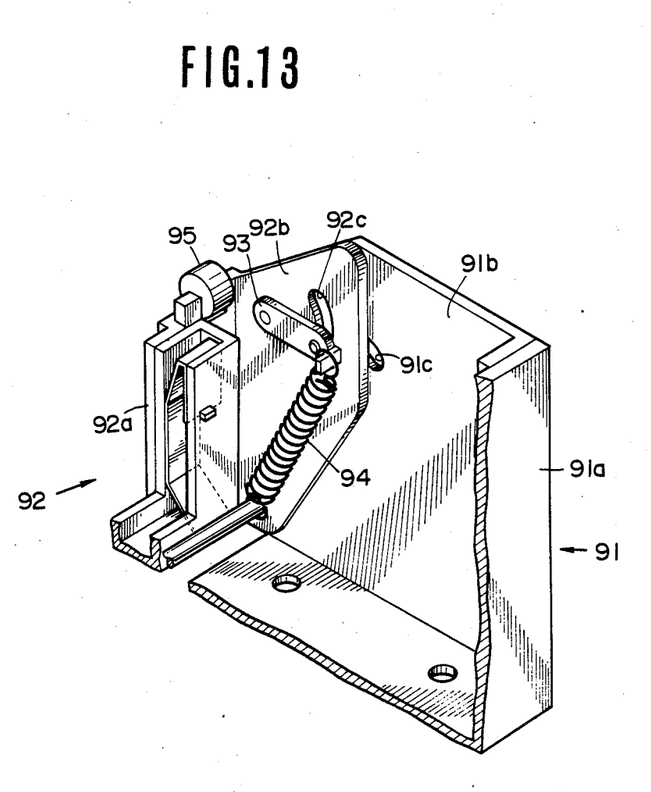
FIG. 13 is a perspective view of an essential part of the slide holder of FIG. 11.

FIGS. 11 to 13 show another slide holder which can be employed in place of the foregoing slide holder. In the figures, the right-hand side corresponds to the direction of projection. Projecting lens 49 is fixed to lens holder 91 which has front wall 91a and pair of left and right side walls 91b extending rearwardly from the left and right side ends of front wall 91a, respectively. Slide holder 92 comprises holding frame 92a and pair of left and right side walls 92b extending forwardly from the left and right side ends of holding frame 92a, respectively. The lower ends of side walls 92b are pivotally connected to the corresponding lower rear corners of left and right side walls 91b of lens holder 91.

Each side wall 92b of slide holder 92 is provided at the inner upper portion thereof with vertically pivotable arm 93. Arm 93 has the rear end thereof pivoted to corresponding side wall 92b and the front end thereof having pin 93a extending outwardly, pin 93a projecting from the side wall 92b while passing through arcuate opening 92c bored in side wall 92b. The front end of arm 93 is urged downwardly by means of spring 94. Inverted-V shaped opening 91c is bored in the upper rear corner of each side wall 91b of lens holder 91. The forward end of pin 93a of the arm is engaged with inverted-V shaped opening 91c and guided thereby. A pair of rollers 95 are attached to the upper end of holding frame 92a of slide holder 92, and abut the mirror surface of the Fresnel mirror when projector head 43 is so pivoted.

When slider holder 92 is employed, pin 93a of arm 93 positions in the rearward end of inverted-V shaped opening 91c in lens holder 91. Holding frame 92a is parallel with projecting lens 49 and pin 93a is urged toward the rearward end by spring 94 thereby pulling arm 93 downwardly. When projector head 43 is folded, rollers 95 are pushed by the Fresnel mirror causing slide holder 92 to pivot outward projecting lens 49, so that pin 93a of arm 93 is moved in inverted-V shaped opening 91c toward the other end thereof. After pin 93a has passed the bent portion of the inverted-V shaped opening at the center thereof, pin 93a reaches the other end of the inverted-V shaped opening by the force of spring 94 as rollers 95 are moved away from the Fresnel mirror. When using the slide holder, the slide holder is manipulated rearwardly into a usable position.

Figure 9:
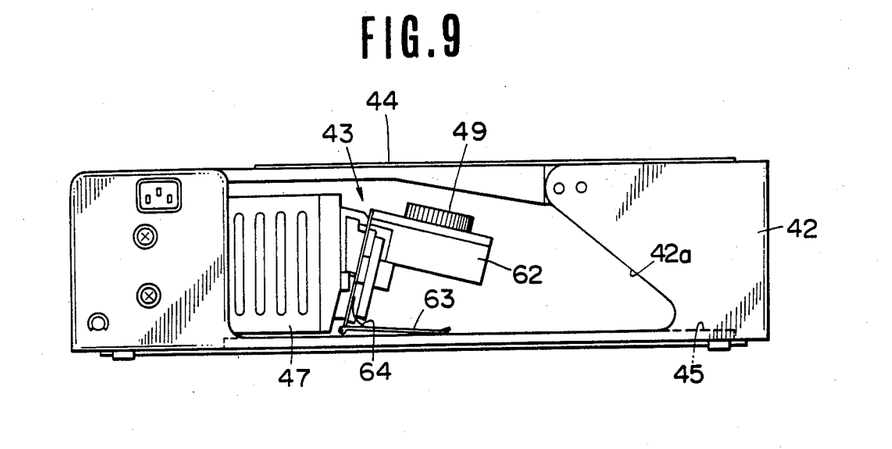
FIG. 9 is a side view of the projector of FIG. 6 with the same being folded.

The slide holder shown in FIGS. 7 and 9 can be manufactured at the relatively low cost, and the slide holder of FIGS. 11 to 13 has the relatively rugged structure.

As shown in FIGS. 7 and 8, projector head 43 is rotatably supported at the lower portion thereof through shafts 65 attached to both lateral sides of the case. During the time when the projector is used, stoppers 67 attached to both ends of stopper shaft 66 provided below shafts 65 are engaged with engagement parts 68 provided in the lower portion of lamp box 47, so that the projector head is set into an upright position on case 42. On the other hand, when the projector head is folded, stoppers 67 are disengaged from engagement parts 68 by pulling stopper shaft knob 66a, provided at one end of stopper shaft 66 and which projects out of the case, leftwardly (see FIG. 8). Thereafter, projector head 43 falls rearwardly as indicated by an arrow (a) in FIG. 7 so that projector head 43 is accommodated within case 42 (see FIG. 9). Stoppers 67 also engage stopper accommodating recesses 69, whereby projector head 43 is secured in such a position.

Figure 10:
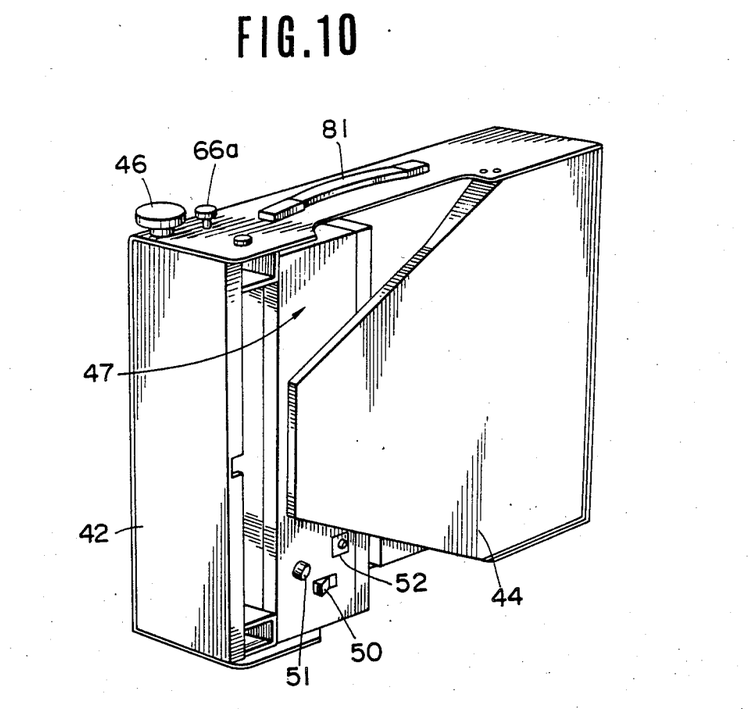
FIG. 10 is a perspective view of the projector of FIG. 6 with the same being folded and assuming an attitude when carried.

Meanwhile, reflecting mirror 71 is bonded to the lower surface of plate member 44 which is made of the same material as that of case 42 and functions as a mirror case. Plate member 44 is rotatably supported at a somewhat rearward position thereof by mirror shaft 72 fixed between both lateral sides of case 42. Plate member 44 extends horizontally and transversely, and may be positioned so that the front end thereof is upwardly disposed (see FIG. 7) with the rear end thereof being locked by retaining rollers 75 at the forward ends of left and right plate member retaining levers 74. Each lever 74 is attached to the rear end of the inner bottom of case 42 and urged forwardly by means of a spring (not shown). Incidentally, when in use the inclination of reflecting mirror 71 is set at such an angle that the beam of light from the light source lamp enters the projecting lens at the maximum efficiency. After use of the projector, the front end of plate member 44 is lowered as indicated by an arrow (b) in FIG. 7, thereby causing the plate member to cover the upper surface of case 42 which further accommodates projector head 43. It is noted that, for minimized projection interference for viewers, the plate member 44 is cut out at both corners thereof, as shown in FIG. 10.

The manner of using the projector so arranged is now described. Depending on that the present projector is employed to project a transparency or a small-sized slide, the user first selects either one of projecting lenses 48 or 49 and sets the selected one in a lens usable position. Thereafter, power source switch 50 is turned ON to actuate the light source lamp. The beam of light from the light source lamp is reflected by reflecting mirror 71 after passing condenser lens 59 and opening 76 formed in the rear side of light source box 47, and then impinges on Fresnel mirror 45. This incident light beam is reflected by Fresnel mirror 45 back toward reflecting mirror 71. After being reflected by reflecting mirror 71 once again, the light beam enters the projecting lens and then is projected on the screen.

After using the projector, projector head 43 is pivoted in the direction of arrow (a) (FIG. 7) and plate member 44 is pivoted in the direction of arrow (b) (FIG. 7), to thereby fold the projector. The projector, therefore, reduces to a substantially compacted shape (see FIGS. 9 and 10). For convenience, grip 81 is attached to one lateral side of the case as shown in FIG. 10, so that the projector may be readily carried like an attache case in the need of transporting the same.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. A reflection type overhead projector comprising:
a case having a Fresnel concave mirror disposed on a bottom wall thereof with a mirror surface facing upwardly for allowing a transparency to be placed thereon;
light source means disposed at the front of said case;
projecting lens means disposed at the front of said case; and
reflecting mirror means disposed above said Fresnel concave mirror with a reflecting surface capable of facing downwardly and forwardly such that a light beam from said light source means is reflected by said reflecting mirror means into said Fresnel concave mirror and the reflected light beam from said Fresnel concave mirror is then reflected by said reflecting mirror means into said projecting lens means; wherein said case comprises a case body and a plate member forming at least a part of the top wall of said case and pivotably connected to said case body, said reflecting mirror is bonded to the lower surface of said plate member, the front end of said plate member is capable of being lifted up causing the mirror surface of said reflecting mirror to face downwardly forwardly when said projector is used, and a cut-out portion adapted for allowing the hand to be inserted therethrough is defined in the lateral side of said case body.

2. A reflection type overhead projector according to claim 1, wherein a projector head comprising said light source means and said projecting lens means is rotatably connected to the front portion of said case.

3. A reflection type overhead projector according to claim 2, wherein said light source means includes a lamp box, a transversely slidable lamp carriage disposed in said lamp box, and a plurality of lamps provided on said lamp carriage side by side in the sliding direction of said lamp carriage.

4. A reflection type overhead projector according to claim 2, wherein said projecting lens means comprises a transversely slidable lens holder, and first and second projecting lenses provided on said lens holder side by side in the sliding direction of said lens holder, said first projecting lens being adapted to project a transparency put on and said Fresnel concave mirror, said second projecting lens being adapted to project a small-sized slide.

5. A reflection type overhead projector according to claim 4, wherein a slide holder for small-sized slides is provided in the rear of said second projecting lens, said slide holder being tiltable toward said second projecting lens.

6. A reflection type overhead projector comprising:
a case having a Fresnel concave mirror disposed on a bottom wall thereof with a mirror surface facing upwardly for allowing a transparency to be placed thereon said case including a case body and a plate member forming at least a part of the top wall of said case and pivotally connected to said case body;
light source means disposed at the front of said case;
projecting lens means disposed at the front of said case, said projecting lens and said light source means being juxtaposed vertically; and
reflecting mirror means secured to the lower surface of said plate member disposed above said Fresnel concave mirror with a reflecting surface capable of facing downwardly and forwardly where the front end of said plate member is capable of being lifted upwardly causing the reflecting surface of the reflecting mirror means to face downwardly and forwardly when the projector is in use so that a light beam from said light source means is reflected by said reflecting mirror means into said Fresnel concave mirror and the reflected light beam from said Fresnel concave mirror is then reflected by said reflecting mirror means into said projecting lens means.

* * * * *